United States Patent
Khattak (10) Patent No.: US 8,537,711 B2
(45) Date of Patent: Sep. 17, 2013

(54) DECENTRALIZED AND COOPERATIVE RECEPTION OF DATA BY BASE STATIONS

(75) Inventor: Shahid Khattak, Peshawar (PK)

(73) Assignee: Vodafone Holding GmbH, Düsseldorf (DE)

( * ) Notice: Subject to any disclaimer, the term of this patent is extended or adjusted under 35 U.S.C. 154(b) by 153 days.

(21) Appl. No.: 13/121,372

(22) PCT Filed: Sep. 25, 2009

(86) PCT No.: PCT/DE2009/075054
§ 371 (c)(1),
(2), (4) Date: May 11, 2011

(87) PCT Pub. No.: WO2010/034310
PCT Pub. Date: Apr. 1, 2010

(65) Prior Publication Data
US 2011/0211536 A1 Sep. 1, 2011

(30) Foreign Application Priority Data

Sep. 26, 2008 (EP) ..................................... 08165231
Oct. 2, 2008 (EP) ..................................... 08165718

(51) Int. Cl.
*H03K 5/01* (2006.01)
*H04L 25/08* (2006.01)

(52) U.S. Cl.
USPC ........... 370/252; 375/346; 375/348; 455/63.1

(58) Field of Classification Search
USPC .................. 370/250–253; 375/144, 148, 285, 375/346–350; 455/63.1, 114.2, 296
See application file for complete search history.

(56) References Cited

U.S. PATENT DOCUMENTS

| | | | | |
|---|---|---|---|---|
| 5,673,291 A | * | 9/1997 | Dent | 375/262 |
| 6,148,041 A | * | 11/2000 | Dent | 375/340 |
| 6,791,995 B1 | * | 9/2004 | Azenkot et al. | 370/436 |
| 8,014,436 B2 | * | 9/2011 | Dent | 375/141 |
| 2010/0002751 A1 | * | 1/2010 | Dent | 375/141 |

FOREIGN PATENT DOCUMENTS

EP 1 906 559 A1 4/2008

OTHER PUBLICATIONS

Khattak et al., "Distributed Iterative Multiuser Detection through Base Station Cooperation", EURASIP Journal on Wireless Communications and Networking, vol. 2008, pp. 1-15 (2008).
Khattak et al., "SAIC aided Distributed Iterative Detection in an Uplink OFDM System", Proceedings of the International OFDM-Workshop (2007).

(Continued)

*Primary Examiner* — Kerri Rose
(74) *Attorney, Agent, or Firm* — Edwards Wildman Palmer LLP; Peter F. Corless; Steven M. Jensen (57) ABSTRACT

The invention relates to a method for eliminating interferences for an interconnected group of base stations of a mobile radio network when receiving data transmitted by mobile radio terminals in the mobile radio network, wherein a) the data are encoded at the mobile radio terminal device as symbols of a modulation alphabet, and modulated at a carrier frequency for transmitting, b) information regarding the symbols received at the base station of the interconnected group are transmitted between the base stations by means of communication connections for eliminating interferences, and c) the base stations of the interconnected group demodulate and decode the received symbols in a cooperative and decentralized manner.

9 Claims, 7 Drawing Sheets

(56) References Cited

OTHER PUBLICATIONS

Khattak et al., "Low Backhaul Distributed Detection Strategies for an Interference Limited Uplink Cellular System", IEEE Vehicular Technology Conference—VTC, pp. 693-697 (2008).

Khattak et al., "Distributed Iterative Detection in an Interference Limited Cellular Network", IEEE Vehicular Technology Conference—VTS, pp. 2349-2353 (2007).

Choi et al., "Iterative Soft Interference Cancellation for Multiple Antenna Systems", IEE Wireless Communications and Networking Conference—WCNC, pp. 304-309 (2000).

* cited by examiner

DECENTRALIZED AND COOPERATIVE RECEPTION OF DATA BY BASE STATIONS

CROSS-REFERENCES TO RELATED APPLICATIONS

This application is a 35 U.S.C. §371 U.S. national entry of International Application PCT/DE2009/075054 having an International filing date of Sep. 25, 2009, which claims priority of European Patent Application 08165231.5 filed on Sep. 26, 2008, and of European Patent Application 08165718.1 Oct. 2, 2008, the contents of each of said applications being incorporated into this description by reference.

TECHNICAL FIELD

The invention concerns a method for eliminating of interference for an interconnected group of base stations of a mobile radio network when receiving data transmitted by mobile radio terminals in the mobile radio network, wherein
a) the data are encoded in a mobile radio terminal as symbols of a modulation alphabet and modulated on a carrier frequency for the transmission,
b) information regarding the symbols received at base stations of the interconnected group are transmitted between the base stations by means of communication links for eliminating interference, and
c) the base stations of the interconnected group demodulate and decode the received symbols in a cooperative and decentralized manner.

Furthermore, the invention concerns a base station in an interconnected group of base stations of a mobile radio network for eliminating of interference when receiving data transmitted by mobile radio terminals in the mobile radio network, containing
a) a receiver for reception of the data which are encoded as symbols of a modulation alphabet and modulated on a carrier frequency for transmission in a mobile radio terminal,
b) an interface for sending and receiving of information with regard to symbols received at base stations of the interconnected group by means of communication links for the eliminating of interference, and wherein
c) the receiver is designed for cooperative and decentralized demodulation and decoding of received symbols together with other base stations of the group.

PRIOR ART

To provide for mobility, radio links are used in mobile radio networks between mobile radio terminals of mobile radio subscribers and stationary base stations in the mobile radio network. Each base station covers one or more geographical regions, which are also known as radio cells. The base stations are connected by means of fixed network or stationary radio relay links to base station controllers and a switching network for voice data or other data. The data traffic on these backward-going links is also known as "backhaul" in English.

For the relaying of data between a mobile radio terminal and a base station, the data are modulated on carrier frequencies at the mobile radio terminal or the base station and broadcast as radio signals. In the UMTS (Universal Mobile Telecommunication System) standard, for example, a quadrature amplitude modulation (QAM) is used. In QAM, amplitude and phase modulation are combined with each other by first amplitude-modulating two oscillations orthogonal to each other and then adding them together. For this, one can use, e.g., a sine and a cosine oscillation, i.e., a sine oscillation that is phase-shifted by 90°. The sum constitutes the amplitude and phase-modulated carrier frequency.

In so-called 4-QAM, the two oscillations are each multiplied by 1 or −1 as amplitude modulation, for example. Thus, four different send symbols are produced, also known as signal points. In this way, the value of a two-bit pattern can be transmitted at a moment of time. Conceivably a 2-dimensional plane can be constructed by amplitude and phase as the polar coordinates, known as the constellation diagram. In this constellation diagram, the signal points are arranged as an orthogonal grid. Accordingly, for a 16-QAM there are sixteen symbols available and for a 256-QAM there are 256 symbols. In this way, a relaying of 4 or 8 bits is possible at an instant of time. Quite generally, a set of available symbols for a modulation is also known as a modulation alphabet. For a bit sequence being relayed, a corresponding symbol is chosen from this modulation alphabet.

Due to noise, interference or other perturbations, received symbols of a sent symbol always contain errors and are scattered about the sent signal point in the constellation diagram with a probability distribution. Effective modern detectors and decoders often determine probability values for received symbols or bits and take these into account in subsequent decoding steps of an iterative decoding. Then, at the output of a decoder, one has so-called likelihood quotients or log-likelihood quotients as probability values or estimated values. These will hereafter also be termed L-values or LLR values. One example of this that is familiar to the person versed in the art is a decoding of Turbo Code, which is used in mobile radio networks of the third generation (e.g., UMTS). Probability values with respect to a symbol or bit are also usually known as soft symbols or soft bits. In contrast, the actual symbols or bits are termed hard symbols or hard bits for better distinction.

To prevent disruptive interference when receiving symbols, different frequencies are customarily used at neighboring base stations. In this way, an already limited spectrum of usable frequencies is further curtailed. This situation is matched up with an exponentially growing need for broadband radio links. In particular, there is a great demand for fast mobile links for Internet with correspondingly high data rates.

One technical concept for achieving a greater reutilization of frequencies in a reception of data from mobile radio terminals by base stations, the so-called uplink, and eliminating the interference which arises in this process, calls for a central processing unit for an interconnected group of base stations. Symbols received at the base stations are quantized without further processing and relayed to the central processing unit. The central processing unit then carries out a joint processing and decoding of the received symbols. In this case, symbols received from neighboring base stations are treated as possible interference in the processing of symbols of a base station, for example. This approach with a central processing is known, e.g., from A. D. Wyner, "Shannon-theoretic approach to a Gaussian cellular multiple-access channel", IEEE Transactions on Information Theory, 40 (6): 1713-1727, 1994. The drawback to this procedure, besides the costly adoption of new central processing units, is especially the very high data transfer between the base stations and these processing units.

Another technical concept therefore starts from a decentralized, cooperative processing of received symbols by the base stations, which form an interconnected group of base stations for this. This concept is known, e.g., from S. Khattak, G. Fettweis, "Distributive iterative detection in interference limited cellular network", Veh. Techn. Conf. Dublin, Proc. VTC Spring 2007. In this case, the demodulation of all received symbols is distributed among the interconnected group of interacting base stations. Each base station of the group carries out local calculations regarding received symbols and relays results as information for further processing to neighboring base stations. An iterative processing is also possible here. For an exchange of the information, communication links and corresponding interfaces are provided at the base stations.

As information to be exchanged between the base stations, one will use, e.g., L-values for received symbols, which are available at an output of a detector or decoder at each base station. Obviously, a very high performance will be achieved if all L-values regarding received symbols are relayed with high accuracy between the base stations. A base station receiving this information uses the L-values to reconstruct the symbols received at neighboring base stations. The symbols are then used to determine and eliminate disruptions caused by the latter in received symbols. However, once again the drawback here is that a very large data transfer across the communication links is necessary. Since cable links of outside firms are usually leased for this, substantial costs arise.

If, on the other hand, a so-called hard-bit decision is used to determine the hard bits received from the L-values and this is exchanged as information, the result is a significantly smaller data rate. But since the hard bits no longer contain any information on reliability, substantial errors arise in an interference reconstruction and the determination of reliability values in a decoding and thus the distributed demodulation is much less powerful.

DISCLOSURE OF THE INVENTION

The problem of the invention is therefore to avoid the drawbacks of the prior art and to achieve a higher capability with smaller data transfer rate in a decentralized cooperative processing of received symbols in an interconnected group of base stations.

According to the invention, the problem is solved in a method of the aforementioned kind for eliminating of interference for an interconnected group of base stations of a mobile radio network when receiving data that is relayed by mobile radio terminals in the mobile radio network in that
d) a statistical expectation value of a received symbol is determined each time at a base station of the group and relayed as information for the eliminating of interference.

Furthermore, the problem is solved with a base station of the aforementioned kind in an interconnected group of base stations of a mobile radio network for eliminating of interference when receiving data that is relayed by mobile radio terminals in the mobile radio network in that
d) a determination module is provided for determining a statistical expectation value of a received symbol, wherein the statistical expectation value is relayed as information for eliminating of interference.

The statistical expectation value of a received symbol can be represented as a point in a constellation diagram and thus as a 2-dimensional value or vector. For example, instead of exchanging all L-values of a received symbol in regard to the symbols of a modulation alphabet being used as information between base stations of the group, in the method of the invention and the base station of the invention each time only one statistical expectation value of a received symbol is transmitted. In this way, a considerable reduction is achieved in the data transfer volume between the base stations, the so-called backhaul, in a cooperative, distributed processing of received symbols. On the other hand, the statistical expectation value contains information on a reliability of received symbols. This is no longer given for bit patterns or symbols which are determined from L-values during a decoding. Therefore, the capability of the cooperative, decentralized demodulation and decoding by a group of base stations is increased by relaying of expectation values, instead of decoded bit patterns or symbols. The method of the invention and the base station of the invention thus constitute an optimized trade-off between a data transfer volume and a performance capability in a decentralized cooperative reception of symbols by an interconnected group of base stations.

One advantageous embodiment of the invented method for eliminating of interference for an interconnected group of base stations of a mobile radio network when receiving data is accomplished by a calculation of the statistical expectation value from estimated values of the received symbol after a selected decoding step of the receiver of the base station. Estimated values of received symbols are present in newer efficient decoding methods, such as L-values after a decoding step at a detector or decoder output. The statistical expectation value of a received symbol can be determined in this way quickly, without major expenditure, and making use of available resources from the available estimated values by means of the determination module.

Preferably, in one embodiment of the invented method, there are provided a selecting of a symbol of the modulation alphabet that lies closest to the statistical expectation value and a relaying of the bits corresponding to this symbol as a quantization of the statistical expectation value. Thanks to such a quantization, the data transfer volume corresponds to the favorable small data transfer volume when relaying of decoded bit patterns. In contrast with the decoded bit patterns, however, the bits relayed as a quantization of the expectation value contain information about a reliability of received symbols and make possible a more powerful distributed and cooperative demodulation and decoding. Since the expectation value as a soft symbol drifts toward the origin of a constellation diagram in the case of weaker estimated values, bits determined by the described quantization of the expectation value differ from bits that are determined by a decoding.

Another preferred embodiment of the method of the invention is achieved in that, at one base station of the interconnected group
a) the symbols received at the other base stations are reconstructed with received expectation values from other base stations of the group, and
b) the reconstructed symbols are used to eliminate interference in one received symbol.

For example, a modulator in the receiver of a base station can serve to reconstruct the symbols received at other base stations by received expectation values. The reconstructed symbols are interpreted as interference and, for example, subtracted from received symbols by means of a subtractor. In this way, a very effective elimination of interference is realized, such as arises from reusing of frequencies in a cooperative reception of data with an interconnected group of base stations.

In one advantageous embodiment of the method of the invention, a new expectation value for a received symbol is determined iteratively with received expectation values and the new expectation value is relayed to other base stations of the group. Thanks to an iterative procedure, a very powerful cooperative demodulation and decoding of received symbols is achieved, distributed among the base stations of the group. The accuracy of the outcome can be controlled by the number of iterations. A very effective iterative decoding of received symbols is now also feasible by a cooperative group of base stations.

Moreover, in one advantageous modification of the method of the invention, reconstruction levels of the quantization of the statistical expectation value are optimized with a probability distribution for received symbols. A quantization of the statistical expectation value causes an unavoidable information loss in the decentralized cooperative processing of received symbols by an interconnected group of base stations. Quantization errors produced in this way propagate themselves especially in an iterative signal processing and have negative impact on the overall signal processing process. Bit patterns occur with differing frequency during a quantization of expectation values, depending on a probability distribution of the received symbols. Thanks to a suitable quantization method, reconstruction levels can therefore be optimized so that an information loss and hence quantization errors are reduced. This has a beneficial effect on the decentralized cooperative processing of received symbols. A quantization can be done, for example, by means of a Lloyd-Max quantization according to S. Lloyd, "Least squares quantization in PCM", (unpubl. Bell Lab. Techn. Note, 1957) IEEE Trans. Inf. Theory, vol. IT-28, pp. 129-137, 1982, and J. Max, "Quantization for minimum distortion", IEEE Trans. Inf. Theory, vol. 6, pp. 7-12, 1960. In this quantization, the mean-square error between the probability densities of continuous and quantized values is minimized by adjusting the level of reconstruction.

One advantageous modification of the base station of the invention in an interconnected group of base stations of a mobile radio network for eliminating of interference during the reception of data calls for a quantization module, which selects a symbol of the modulation alphabet lying closest to the statistical expectation value and prepares bits that correspond to this symbol for a transmittal as a quantization of the statistical expectation value. In this way, the data transfer volume corresponds to the favorable small data transfer volume when transmitting decoded bit patterns. The bits transmitted as a quantization of the expectation value additionally contain information as to a reliability of received symbols and therefore enable a more powerful distributed and cooperative demodulation and decoding of received symbols.

Another preferred embodiment of the base station of the invention is achieved in that an optimization unit is provided for optimizing of reconstruction levels in the quantization of the statistical expectation value each time according to a probability distribution of received symbols. For example, the optimization unit can use a Lloyd-Max quantization. As in the corresponding embodiment of the method of the invention, quantization errors and thus an information loss during the quantization are reduced in this embodiment. This boosts the performance of the decentralized, cooperative processing of received symbols by an interconnected group of base stations.

Further embodiments and advantages will emerge from the subject of the subclaims, as well as the drawings with the corresponding description.

A sample embodiment of the invention is explained more closely below with reference to the accompanying drawings.

PREFERRED SAMPLE EMBODIMENT

Figure 1:
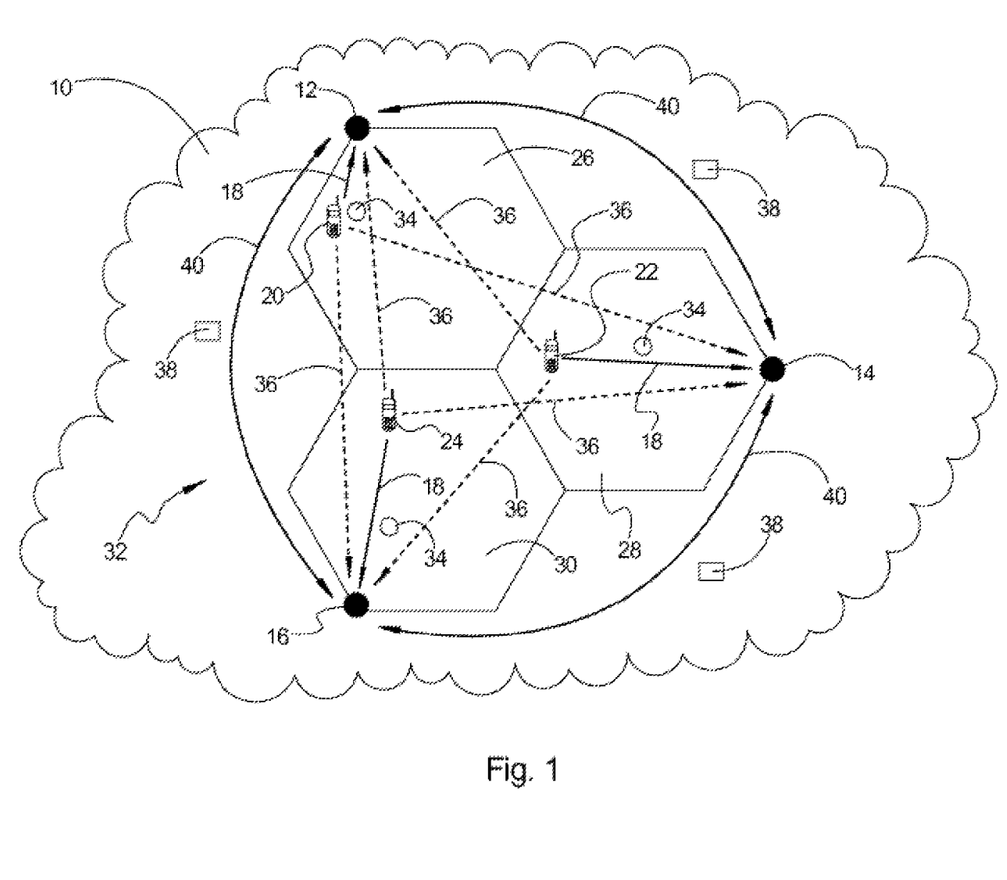
FIG. 1 shows in a schematic diagram an interconnected group of base stations in a mobile radio network for a decentralized and cooperative reception of data that is transmitted by mobile radio terminals.

In FIG. 1, a public cellular mobile radio network for mobile communication and use of data services is denoted by 10. The mobile radio network 10 can be configured essentially according to the UMTS, HSPA (High Speed Packet Access), LTE/SAE (Long Term Evolution/Service Architecture Evolution) Standard, or another standard of the third or fourth generation. Such mobile radio networks with the respective components are familiar to the practitioner. For sake of simplicity, therefore, the mobile radio network 10 is shown stylized simply as a cloud.

The mobile radio network 10 contains stationary base stations 12, 14, 16, in order to provide radio links 18 to mobile radio terminals 20, 22, 24. In this way, a mobility is realized for mobile radio subscribers when using the mobile radio terminals 20, 22, 24. The base stations 12, 14, 16 in this way set up radio cells 26, 28, 30 as geographical coverage regions. The radio cells 26, 28, 30 are shown symbolized as hexagons in FIG. 1. Actual radio cells can assume very different shapes, for example, depending on terrain and environmental factors or a dynamic adaptation of a transmission power. Depending on the radio cell 26, 28, 30 in which a mobile radio terminal 20, 22, 24 finds itself, it is usually assigned to the corresponding base station 12, 14, 16 for the exchange of data.

In addition, the base stations 12, 14, 16 form an interconnected group 32 of base stations for the decentralized and cooperative reception of data 34 which is transmitted by the mobile radio terminals 20, 22, 24. The mobile radio terminals 20, 22, 24 preferably use the same radio frequencies in order to achieve a high reutilization of frequencies within a given, limited frequency spectrum. The interference 36 arising in this way and indicated by dotted arrows in FIG. 1 is eliminated by an exchange of information 38 on received signals between the base stations 20, 22, 24. For this, an iterative processing of received signals takes place. This procedure is therefore also called a distributed, iterative multi-user detection by a cooperation of base stations.

For the relaying of information 38 on received signals, communication links 40 are provided between the base stations 12, 14, 16. The communication links 40 are preferably configured as cable-connected links or stationary radio relay links and can be realized directly between the base stations 12, 14, 16 or via other components of the mobile radio network 10, such as base station controllers (BSC) or radio network controllers (RNC).

Instead of the interconnected group 32 of three base stations 12, 14, 16 represented as an example in FIG. 1, an interconnected group of two or more than three neighboring base stations is also possible. Furthermore, several interconnected groups 34 of base stations can be provided in the mobile radio network 10, while one base station 12, 14, 16 can also be a member of several interconnected groups 34 at the same time. Interconnected groups 34 of base stations 12, 14, 16 can be provided statically or dynamically in the mobile radio network 10, depending on how many subscribers are present.

Figure 2:
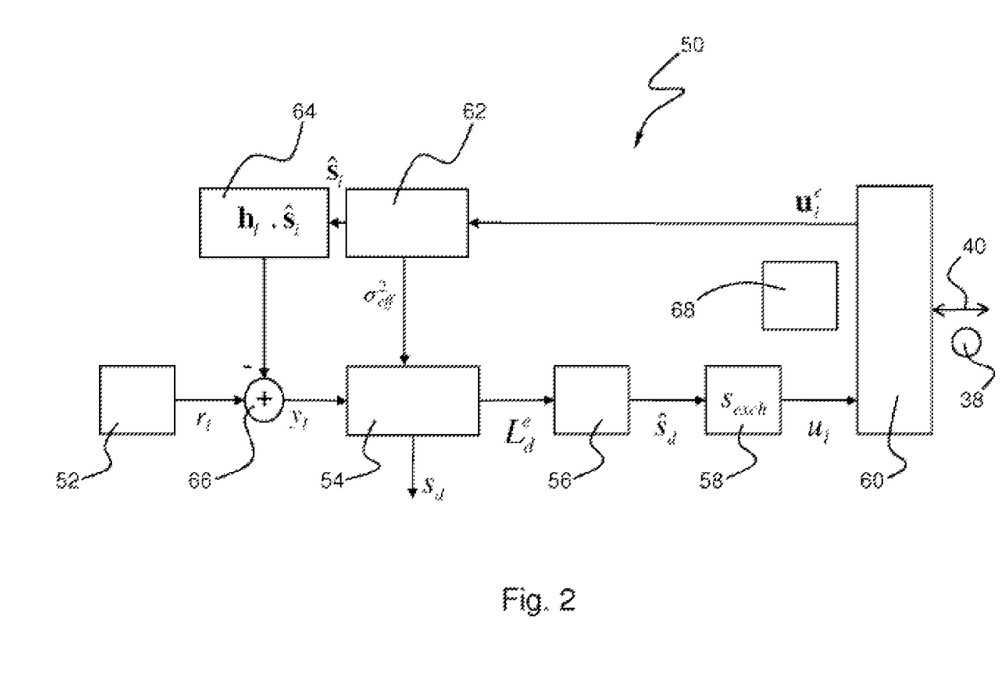
FIG. 2 shows in a schematic diagram a receiver of a base station for the decentralized and cooperative reception of data per FIG. 1.

FIG. 2 shows in a schematic block diagram a receiver 50, which is provided in each of the base stations 12, 14, 16 (see FIG. 1) for the decentralized and cooperative reception of data 34. The receiver 50 contains an input unit 52 for signals received by an antenna and a detector and decoding unit 54 for the iterative decoding of the received signals or symbols. Furthermore, a determination module 56 is provided in the receiver 50 to determine a statistical expectation value of a received symbol from estimated values in regard to received symbols, and a quantization module 58 to quantize or digitize the determined expectation value for a transmittal to other base stations 12, 14, 16. The transmittal is done across an interface 60 and the communication links 40. Moreover, by way of the interface 60, a reception of corresponding expectation values of other base stations 12, 14, 16 of the group 32 is possible. These expectation values serve as information 38 on the symbols received at the other base stations 12, 14, 16. By means of a modulator 62 for reconstruction of symbols from received information 38, means 64 of factoring in channel properties, such as path losses, and a subtractor 66, symbols received at the other base stations 12, 14, 16 are eliminated as interference from received symbols. The determination module 56, the quantization module 58, the interface 60, the modulator 62, the means 64 and the subtractor 66 are provided in the receiver 50 in this sample embodiment. In alternative embodiments, some of these components can be provided partially or entirely outside of the receiver 50 in the particular base station 12, 14, 16 or in other components of the receiver 50. Moreover, an optimization module 68 can be used to optimize reconstruction levels during a quantization of expectation values.

Figure 3:
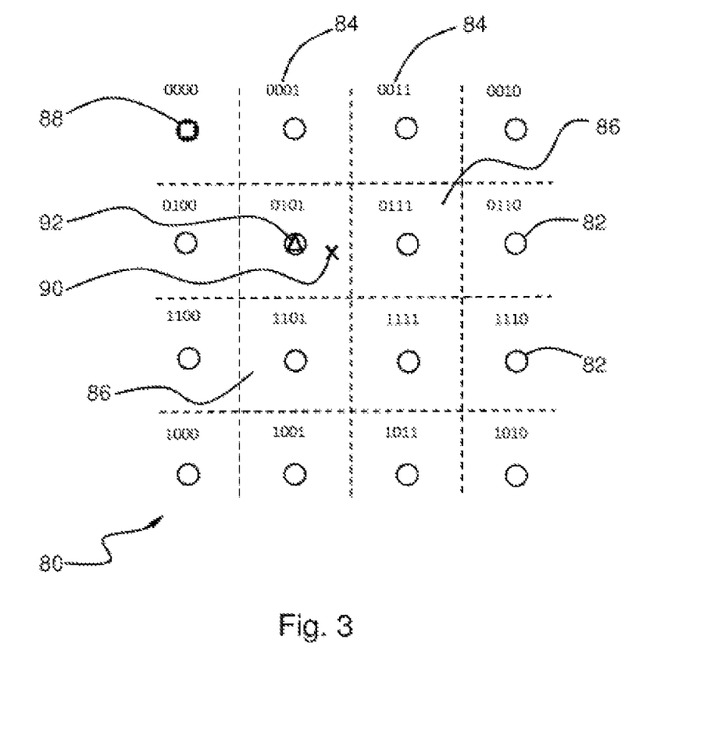
FIG. 3 shows in a constellation diagram different symbols reconstructed at a base station.

In what follows, modes of operation of the base stations 12, 14, 16 with the receivers 50 along with a sample procedure for the iterative, decentralized and cooperative reception of data 34 shall be described by means of FIG. 1, FIG. 2 and FIG. 3. For this, one base station 12, 14, 16 of the group 32 shall be chosen as an example and denoted as the 1-th base station. In FIG. 2, this circumstance is indicated by a subscript 1. The subscript d designates a desired data stream and the index i a dominant interfering data stream. Extrinsic or a posteriori probability information is denoted by a superscript e.

The active mobile radio terminals 20, 22, 24 in the mobile radio network 10 are each assigned to a base station 12, 14, 16 (see arrows 18 in FIG. 1). For a transmission of data 34 from a mobile radio terminal 20, 22, 24 to the coordinated base stations 12, 14, 16 via a link 18, a so-called uplink, the data 34 are modulated as symbols on a carrier frequency and sent out by the mobile radio terminal 20, 22, 24. The symbols are chosen from an available set of symbols according to the bit patterns being transmitted. This set of symbols is also called a modulation alphabet. For example, in a quadrature amplitude modulation with sixteen symbols (16-QAM), a sequence of four bits is transmitted per symbol. The symbols of the 16-QAM can be represented in a constellation diagram (see FIG. 3). For the error correction, bit sequences of neighboring symbols differ by only one bit. Such a coding is known as Gray coding.

An antenna at the 1-th base station 12, 14, 16 receives the symbols from the coordinated mobile radio terminal 20, 22, 24 with perturbations. Besides noise, there occurs in particular interference 36 by transmitting mobile radio terminals 20, 22, 24 in neighboring radio cells 26, 28, 30. Such interference is also known as other cell interference (OCI) and occurs, e.g., by a reusing of frequencies. Received signals or symbols $r_1$ are taken on to the input unit 52 of the receiver 50.

In a first step, the received symbols $r_1$ are passed from the input unit 52 directly to the detector and decoding unit 54. The detector and decoding unit 54 performs a first traditional single-user detection and single-user decoding, treating interfering symbols from other mobile radio terminals 20, 22, 24 as perturbations. After this, likelihood quotients $L^e_d$ are present at an output of the detector and decoding unit 54 as estimated values of transmitted symbols. These likelihood quotients $L^e_d$ are then used by the determination module 56 to determine an expectation value $\hat{s}_d$ for a transmitted symbol. The expectation value $\hat{s}_d$ for example follows from:

$$\hat{s}_d = E\{S_d \mid L^e_d\} = \sum_{s_k \in A} s_k p(S_d = s_k \mid L^e_d)$$

Here, A denotes a modulation alphabet, $s_k$ a symbol of the modulation alphabet, and $s_d$ a received symbol as random variable. The statistical expectation value $\hat{s}_d$ is also called a soft symbol in the following.

The soft symbol $\hat{s}_d$ is quantized and digitized with the quantization module 58 for a transmittal to other base stations 12, 14, 16. For this, one first determines the symbol $s_{exch}$ of the modulation alphabet that lies closest to the soft symbol $\hat{s}_d$:

$$s_{exch} = \operatorname*{argmin}_{s_k \in A} |\hat{s}_d - s_k|$$

Such a decision for a hard symbol $s_{exch}$ is known as a hard symbol decision. The bit sequence $u_1$ corresponding to this hard symbol $s_{exch}$ is relayed across the interface 60 and the communication links 40 to other base stations 12, 14, 16 as information 38 being exchanged.

This procedure is illustrated in FIG. 3 by means of a constellation diagram 80. In the constellation diagram 80, all symbols or constellation points of a 16-QAM with Gray coding are shown as circles 82. Above the constellation points 82, bit sequences 84 correspondingly assigned to a Gray code are shown. Neighboring bit sequences 84 differ only by one bit. Around the constellation points 82 are shown corresponding Voronoi regions 86 by means of broken lines. A hard bit decision directly from the likelihood quotients $L^e_d$ would lead, for example, to the symbol 88 with bit sequence 0000, represented as a square. The expectation value $\hat{s}_d$ determined from the likelihood quotients $L^e_d$ in this example is indicated as a cross 90 in FIG. 3. The symbol $s_{exch}$ lying closest to the expectation value $\hat{s}_d$ is indicated by a triangle 92. The corresponding bit sequence 0101 is relayed as information 38 (see FIG. 2) to other base stations 12, 14, 16 (see FIG. 1). As compared to the bit sequence 0000 (direct hard decision from the likelihood quotients $L^e_d$), the bit sequence 0101 advantageously contains probability information about a received symbol and thus enables a more effective decentralized and cooperative reception of symbols by the interconnected group 32 of base stations for the same data volume.

From the other base stations 14, 16, 18 of the group 32, the 1-th base station 14, 16, 18 accordingly receives via the communication links 40 and the interface 60 bit sequences $u^e_i$ regarding determined expectation values $\hat{s}_i$ (see FIG. 2). Bold letters indicate vectors. The modulator 62 reconstructs from the bit sequences $u^e_i$ the corresponding expectation values $\hat{s}_i$ or the symbols $s_{i,exch}$ lying closest to $\hat{s}_i$ as expectation values $\hat{s}_i$. These expectation values $\hat{s}_i$ are then eliminated from the received signal as perturbing interference. For this, channel properties $h_1$ such as path losses are considered in a reconstruction by the means 64. An energy of interfering symbols $h_1 \cdot \hat{s}_i$ determined in this way is subtracted from the received signal $r_1$ by the subtractor 66. As the result, after such an elimination of interference, we have an interference-reduced signal $y_1$:

$$y_l = r_l - h_l \cdot \hat{s}_i = r_l - \sum_{\forall i \neq l} h_{li} \hat{s}_i$$

The signal $y_1$ is passed on to the detector and decoding unit 54. After a single-user detection and decoding, one then has essentially more precise likelihood quotients $L^e_d$, from which in turn a more precise expectation value $\hat{s}_d$ is determined and transmitted to other base stations 12, 14, 16 of the group 32. In each subsequent iteration of the method, the above-described subtraction of interference is first done and then a single-user detection and decoding for received symbols. Finally, the desired symbol $s_d$ is present with a low error rate, despite interference due to reusing of frequencies.

Figure 4:
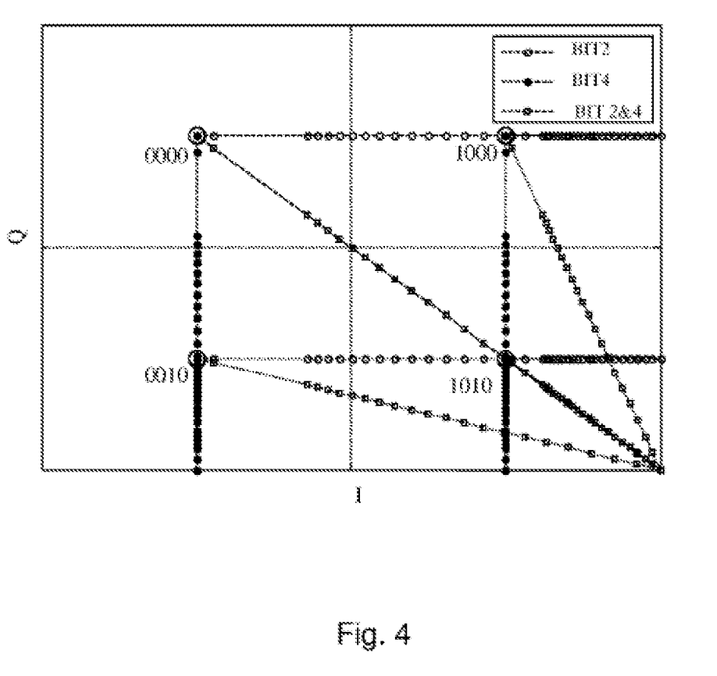
FIG. 4 shows a shifting of an expectation value as a soft symbol in a constellation diagram during a 16-QAM with gray coding when a reliability of L-values is changed.

FIG. 4 shows a shifting of an expectation value as a soft symbol in a constellation diagram for a 16-QAM with Gray coding when a reliability of estimated values is changed. For this, the magnitude of the log-likelihood quotient is varied from ∞ to 0 and the 2nd bit and 4th bit of a bit sequence coordinated with the soft symbol are considered. The probability of a reconstructed soft symbol changes as shown in FIG. 4 by many of the reconstructed soft symbols shifting toward the origin of the constellation diagram (bottom right). We use I to designate a carrier oscillation "In Phase" in a QAM and Q to designate a carrier oscillation with "Quadrature", i.e., shifted 90° in phase.

Figure 5:
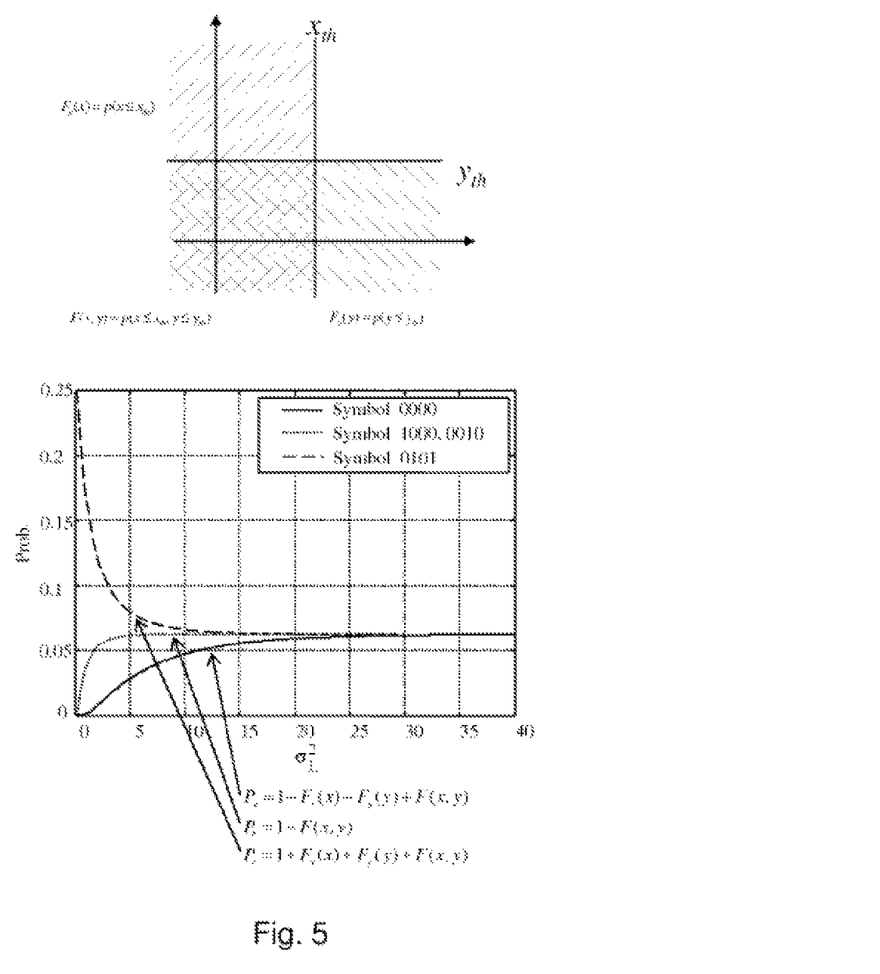
FIG. 5 shows, as a function of the variance of L-values, the probability that a soft symbol or expectation value lies within a Voronoi region about various constellation points of a 16-QAM with gray coding.

With a known probability distribution of reconstructed soft symbols $\hat{s}_d$, a further boosting of the performance of the decentralized cooperative reception with the interconnected group 32 of base stations is possible by an optimization of reconstruction levels. In FIG. 5, probabilities for different soft symbols are represented as a function of the variance $\sigma^2_L$ of log-likelihood quotients. A bimodal Gaussian distribution is assumed. The soft symbols lie in a Voronoi region about different constellation points of a 16-QAM with Gray coding. Depending on the probability distribution of the reconstructed soft symbols, bit sequences occur with differing frequency in a quantization. Due to the Gray coding, individual bits of a bit sequence also have a differing probability.

If we know the probability distribution of likelihood quotients for each bit within a Voronoi region, we can therefore determine optimal reconstruction levels as a function of the variance of the likelihood quotients. An optimization is done so as to reduce the information loss upon quantization. For this, the optimization unit 68 can perform, say, a Lloyd-Max quantization according to S. Lloyd, "Least squares quantization in PCM", (unpubl. Bell Lab. Techn. Note, 1957) IEEE Trans. Inf. Theory, vol. IT-28, pp. 129-137, 1982, and J. Max, "Quantizing for minimum distortion", IEEE Trans. Inf. Theory, vol. 6, pp. 7-12, 1960. In this quantization, the mean-square error between the probability densities of continuous and quantized values is minimized by adjusting the levels of reconstruction. Also, a so-called "Lloyd-Max quantization in the soft bit domain" is possible per S. Khattak, W. Rave and G. Fettweis, "Distributed Iterative Multiuser Detection through Base Station Cooperation", EURASIP J. on Wireless Comm. and Networking Volume 2008, Article ID 390489.

Figure 6:
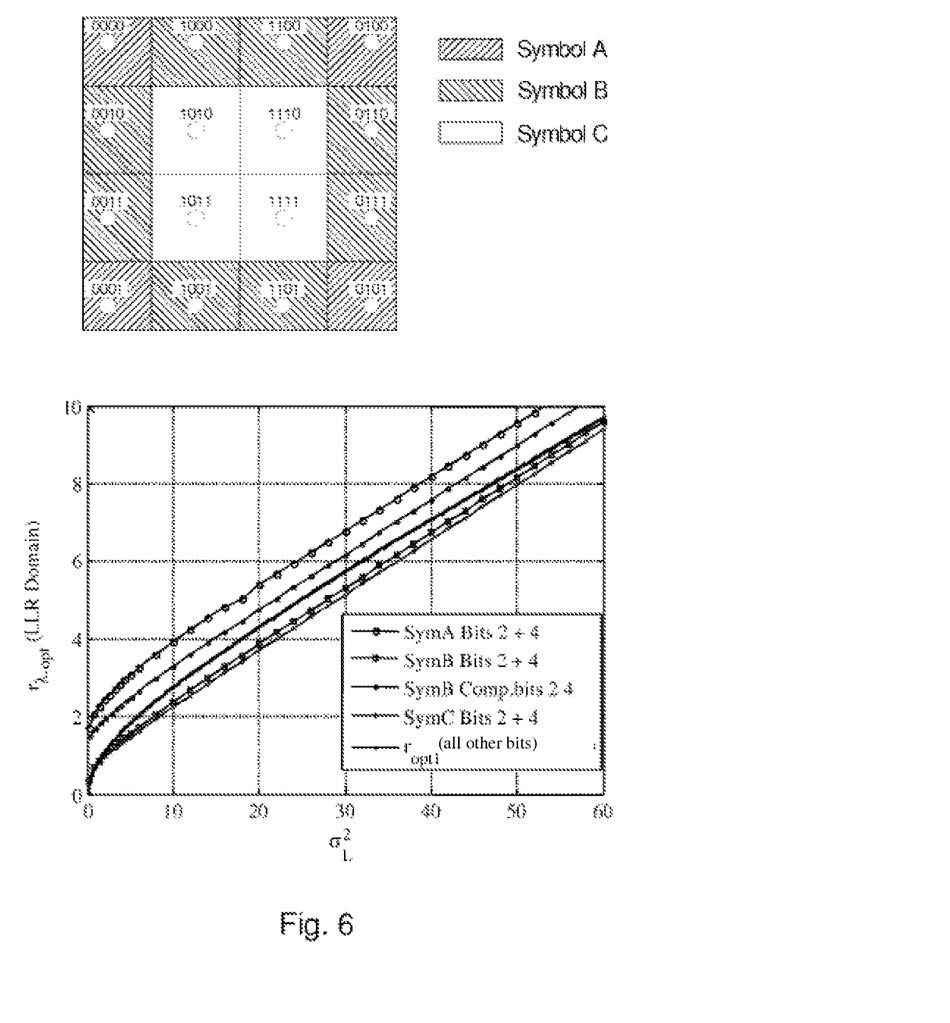
FIG. 6 shows optimized reconstruction levels in a diagram as a function of the variance of the L-values for various transmitted bits within a constellation of a 16-QAM.

For this, optimized reconstruction levels can be calculated in advance as a function of the variance $\sigma^2_L$ of log-likelihood quotients and used during a reception of hard bits depending on the bit sequence of a base station 12, 14, 16. FIG. 6 shows optimized reconstruction levels for bits of different symbols that were obtained by applying a Lloyd-Max quantization in the soft bit domain. The variance $\sigma^2_L$ is determined and provided by the modulator 62 (see FIG. 2).

Figure 7:
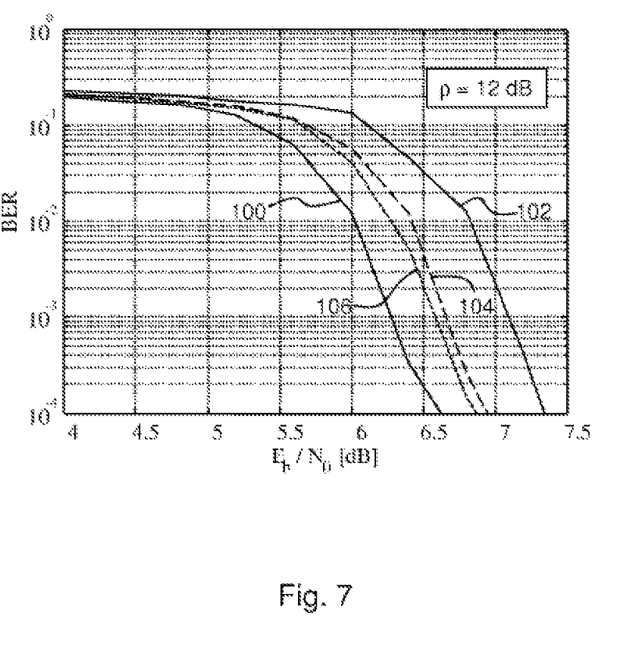
FIG. 7 shows in a diagram error rates in an interconnected group with four base stations and four mobile radio terminals as the outcome of a numerical simulation.

FIG. 7 shows bit error rates (BER) for various exchanged information in a decentralized and cooperative reception of data by an interconnected group of base stations in a diagram. The bit error rate is represented as a function of the bit energy/noise power density ratio Eb/N0. The ratio of the energy Eb used for an information bit to the spectral noise power density N0 relates the signal/noise ratio to an information bit. With increasing noise, i.e., decreasing Eb/N0, the bit error rate normally increases. The bit error rates shown in FIG. 7 were calculated by a numerical simulation of four transmitting mobile radio terminals in a group of four base stations with corresponding radio cells. The following features were assumed and used for this: IID Rayleigh channel, code word=512 symbols, 16-QAM modulation with Gray coding, ½ Rate PCCC coding and relative path loss ρ=12 dB.

An exchange of likelihood quotients as soft information between the base stations, solid curve 100, leads to a very low bit error rate, but also to a very large data transfer volume (backhaul). All likelihood quotients must be relayed between the base stations with sufficient accuracy. An exchange of likelihood quotients can therefore be viewed as the upper bound for a capability of a decentralized and cooperative reception of data by an interconnected group of base stations.

On the other hand, an exchange of hard bits, solid curve 102, which are determined directly from the likelihood quotients with a hard bit decision (see FIG. 3, 88), leads to a very small data transfer volume, but a high bit error rate. The hard bits, as described above, no longer contain any reliability information at all. This accomplishes only a low capability in the decentralized and cooperative reception by an interconnected group of base stations. Such an exchange of hard bits can therefore be viewed as the lower bound for the capability of the interconnected group of base stations.

An exchange of static expectation values as a bit sequence of a hard symbol decision by the above-described method and the base stations 12, 14, 16 yields the broken curve 14 as the bit error rate. Based on the curve 100, the bit error rate is reduced by around half as compared to the exchange of hard bits (curve 102). The data transfer volume corresponds to that of the hard bit exchange. For the same small data transfer volume, therefore a substantial increase in capability of the decentralized cooperative reception is achieved with the described method and the base stations 12, 14, 16. Advantageously, no additional process steps or components for a base station are needed for a reception and a reconstruction of expectation values and for a subtraction of interference as compared to an exchange of a hard bit decision.

A further improvement of the bit error rate and thus a boosting of the capability is made possible by an above-described optimization of reconstruction levels during a transmittal of statistical expectation values, broken curve 106.

The invention claimed is:

1. A method for eliminating interference for an interconnected group of base stations of a mobile radio network when receiving data transmitted by mobile radio terminals in the mobile radio network, wherein
the data are encoded in a mobile radio terminal as symbols of a modulation alphabet and modulated on a carrier frequency for the transmission,
information regarding the symbols received at base stations of the interconnected group are transmitted between the base stations by means of communication links for eliminating interference,
the base stations of the interconnected group demodulate and decode the received symbols in a cooperative and decentralized manner, and
a statistical expectation value of one of the received symbols is determined each time at one of the base stations of the interconnected group and relayed as information for eliminating interference, wherein at one of the base stations of the interconnected group:
the symbols received at other base stations of the interconnected group are reconstructed with received expectation values from the other base stations of the interconnected group, and
the reconstructed symbols are used to eliminate interference in the one of the received symbols.

2. The method according to claim 1, wherein the statistical expectation value of the one of the received symbols is determined from estimated values of the one of the received symbols after a selected decoding step of a receiver of the one of the base stations.

3. The method according to claim 1, comprising selecting at least one of the symbols of the modulation alphabet that lies closest to the statistical expectation value and relaying bits corresponding to the selected symbol as a quantization of the statistical expectation value.

4. The method according to claim 1, wherein a new expectation value for the one of the received symbols is determined iteratively with the received expectation values, and the new expectation value is relayed to the other base stations of the interconnected group.

5. The method according claim 1, wherein reconstruction levels of a quantization of the statistical expectation value are optimized with a probability distribution for the received symbols.

6. A base station in an interconnected group of base stations of a mobile radio network for eliminating interference when receiving data transmitted by mobile radio terminals in the mobile radio network, comprising:
a receiver for reception of the data which are encoded as symbols of a modulation alphabet and modulated on a carrier frequency for transmission in a mobile radio terminal,
an interface for sending and receiving of information with regard to symbols received at base stations of the interconnected group by means of communication links for the eliminating of interference,
the receiver is designed for cooperative and decentralized demodulation and decoding of received symbols together with other base stations of the group,
a determination module is provided for determining a statistical expectation value of one of the received symbols, wherein the statistical expectation value is relayed as information for eliminating interference,
a modulator is provided for reconstructing the symbols received at other base stations of the interconnected group, and
a subtractor is provided for subtracting the reconstructed symbols from the one of the received symbols.

7. The base station according to claim 6, wherein a quantization module, which selects at least one of the symbols of the modulation alphabet lying closest to the statistical expectation value and prepares bits that correspond to the selected symbol for transmission as a quantization of the statistical expectation value.

8. The base station according to claim 6, wherein an optimization unit is provided for optimizing reconstruction levels in a quantization of the statistical expectation value each time according to a probability distribution of the received symbols.

9. A method for eliminating interference for an interconnected group of base stations of a mobile radio network when receiving data transmitted by mobile radio terminals in the mobile radio network, comprising:
encoding the data in a mobile radio terminal as symbols of a modulation alphabet and modulated on a carrier frequency for the transmission,
transmitting information regarding the symbols received at base stations of the interconnected group between the base stations by means of communication links for eliminating interference,
demodulating and decoding the received symbols in a cooperative and decentralized manner with the base stations of the interconnected group, and
a statistical expectation value of one of the received symbols is determined each time at one of the base stations of the interconnected group and relayed as information for eliminating interference, wherein at one of the base stations of the interconnected group:
the symbols received at other base stations of the interconnected group are reconstructed with received expectation values from the other base stations of the interconnected group, and
the reconstructed symbols are used to eliminate interference in the one of the received symbols.

* * * * *